US008339542B2

(12) United States Patent  
Biernath et al.

(10) Patent No.: US 8,339,542 B2
(45) Date of Patent: Dec. 25, 2012

(54) PASSIVE AND HYBRID DAYLIGHT-COUPLED N-STACK AND COLLAPSIBLE BACKLIGHTS FOR SUNLIGHT VIEWABLE DISPLAYS

(75) Inventors: Rolf W. Biernath, Wyoming, MN (US); Jennifer R. Yi, Woodbury, MN (US); Keith M. Kotchick, Saint Paul, MN (US)

(73) Assignee: 3M Innovative Properties Company, Saint Paul, MN (US)

( * ) Notice: Subject to any disclaimer, the term of this patent is extended or adjusted under 35 U.S.C. 154(b) by 648 days.

(21) Appl. No.: 12/492,166

(22) Filed: Jun. 26, 2009

(65) Prior Publication Data

US 2010/0328578 A1   Dec. 30, 2010

(51) Int. Cl.
*G02F 1/1335* (2006.01)
(52) U.S. Cl. ............... 349/68; 349/64; 349/67; 349/73; 349/115; 362/561
(58) Field of Classification Search ............ 349/64, 349/67, 68, 73, 112, 114, 115; 362/561
See application file for complete search history.

(56) References Cited

U.S. PATENT DOCUMENTS

| | | | |
|---|---|---|---|
| 3,828,909 A | 8/1974 | Roano et al. | |
| 3,838,565 A | 10/1974 | Carlyle | |
| 3,838,909 A | 10/1974 | Fitzgibbons | |
| 3,966,303 A | 6/1976 | Yamamoto | |
| 4,176,084 A | 11/1979 | Luckenbach | |
| 4,289,383 A | 9/1981 | Schwarzschild | |
| 4,298,249 A | 11/1981 | Gloor et al. | |
| 4,635,128 A | 1/1987 | Toyoda | |
| 5,099,343 A | 3/1992 | Margerum et al. | |
| 5,211,463 A | 5/1993 | Kalmanash | |
| 5,211,493 A | 5/1993 | Stephenson et al. | |
| 5,412,492 A | 5/1995 | Zammit et al. | |
| 5,442,522 A | 8/1995 | Kalmanash | |
| 5,479,276 A | 12/1995 | Herbermann | |
| 5,479,328 A | 12/1995 | Lee et al. | |
| 5,510,915 A | 4/1996 | Ge et al. | |

(Continued)

FOREIGN PATENT DOCUMENTS

CN   101349833   1/2009

(Continued)

OTHER PUBLICATIONS

U.S. Appl. No. 60/939,083, filed May 19, 2008, Titled "White Light Backlights and the Like with Efficient Utilization of Colored LED Sources".

(Continued)

*Primary Examiner* — Michael Caley (57) ABSTRACT

A passive daylight-coupled display having an LCD panel, a diffuser, and a curved reflector behind the LCD panel. For passive backlighting, the diffuser transmits daylight to the reflector, which reflects the daylight to the LCD panel and provides for substantially uniform distribution of the daylight on the LCD panel for backlighting it. An N-stack daylight-coupled display includes a plurality of passive backlights cascaded in a stack for backlighting of LCD panels or static display panels. One N-stack display can include an active light source to provide light to the reflectors, and a secondary light source to provide light to at least one of the reflectors to provide backlighting of the display in low lighting conditions. A collapsible daylight-coupled display includes a daylight-coupled backlight that is collapsible when not in use for hand-held or portable display devices.

24 Claims, 7 Drawing Sheets

U.S. PATENT DOCUMENTS

| | | | |
|---|---|---|---|
| 5,521,465 A | 5/1996 | Budzilek et al. | |
| 5,536,558 A | 7/1996 | Shelton | |
| 5,739,876 A | 4/1998 | Stewart | |
| 5,760,760 A | 6/1998 | Helms | |
| 5,777,704 A | 7/1998 | Selker | |
| 5,786,801 A | 7/1998 | Ichise | |
| 5,818,553 A | 10/1998 | Koenck et al. | |
| 5,986,728 A | 11/1999 | Bernard | |
| 6,034,750 A | 3/2000 | Rai et al. | |
| 6,173,517 B1 | 1/2001 | Eibner et al. | |
| 6,184,946 B1 | 2/2001 | Ando et al. | |
| 6,188,460 B1 * | 2/2001 | Faris | 349/176 |
| 6,219,116 B1 * | 4/2001 | Yuuki et al. | 349/58 |
| 6,273,577 B1 | 8/2001 | Goto et al. | |
| 6,285,426 B1 * | 9/2001 | Akins et al. | 349/114 |
| 6,428,198 B1 | 8/2002 | Saccomanno et al. | |
| 6,447,132 B1 | 9/2002 | Harter, Jr. | |
| 6,592,232 B2 | 7/2003 | McGowan | |
| 6,771,331 B1 | 8/2004 | Kubota et al. | |
| 6,795,137 B1 | 9/2004 | Whitted et al. | |
| 6,929,392 B2 | 8/2005 | Kim et al. | |
| 6,961,108 B2 | 11/2005 | Wang et al. | |
| 7,027,113 B2 | 4/2006 | Kim et al. | |
| 7,121,710 B2 | 10/2006 | Kim et al. | |
| 7,213,955 B1 | 5/2007 | Ladouceur et al. | |
| 7,306,356 B1 | 12/2007 | Ahmadi | |
| 7,427,140 B1 | 9/2008 | Ma | |
| 7,430,349 B2 | 9/2008 | Jones | |
| 7,510,288 B2 | 3/2009 | Shin et al. | |
| 7,522,775 B2 | 4/2009 | Boon | |
| 2002/0114147 A1 | 8/2002 | Harter, Jr. | |
| 2003/0095397 A1 | 5/2003 | McGowan | |
| 2003/0193457 A1 | 10/2003 | Wang et al. | |
| 2003/0201702 A1 | 10/2003 | Kim et al. | |
| 2003/0204977 A1 | 11/2003 | Hong | |
| 2004/0181989 A1 | 9/2004 | Miller | |
| 2004/0223100 A1 * | 11/2004 | Kotchick et al. | 349/114 |
| 2004/0252940 A1 | 12/2004 | Atac et al. | |
| 2004/0263720 A1 | 12/2004 | Wang et al. | |
| 2005/0018106 A1 | 1/2005 | Wang et al. | |
| 2005/0146651 A1 | 7/2005 | Whitted et al. | |
| 2006/0002140 A1 | 1/2006 | Kim et al. | |
| 2007/0091635 A1 | 4/2007 | Ladouceur et al. | |
| 2007/0171322 A1 | 7/2007 | Shin et al. | |
| 2007/0195519 A1 | 8/2007 | Shin et al. | |
| 2007/0200972 A1 | 8/2007 | Ladouceur et al. | |
| 2007/0273680 A1 | 11/2007 | Yang et al. | |
| 2008/0064096 A1 | 3/2008 | Renauld et al. | |
| 2008/0064115 A1 | 3/2008 | Hiramatsu et al. | |
| 2008/0064133 A1 | 3/2008 | Lee et al. | |
| 2008/0117346 A1 | 5/2008 | Jepson | |
| 2008/0201999 A1 | 8/2008 | Chung et al. | |
| 2008/0266850 A1 | 10/2008 | Masri | |
| 2009/0027591 A1 | 1/2009 | Hwang et al. | |
| 2009/0027921 A1 | 1/2009 | Chou et al. | |
| 2009/0061945 A1 | 3/2009 | Ma | |
| 2009/0213041 A1 | 8/2009 | Unger et al. | |
| 2009/0268429 A1 | 10/2009 | Hashimoto et al. | |
| 2010/0073791 A1 | 3/2010 | Mahowald | |
| 2010/0141869 A1 | 6/2010 | Biernath et al. | |

FOREIGN PATENT DOCUMENTS

| | | |
|---|---|---|
| DE | 3834492 | 10/1988 |
| EP | 0 399 506 | 5/1990 |
| FR | 2866464 | 2/2004 |
| GB | 2 370 404 | 6/2002 |
| GB | 2 405 252 | 2/2005 |
| JP | 09-297305 | 11/1997 |
| JP | 10-48615 | 2/1998 |
| JP | 10-123507 | 5/1998 |
| JP | 11-202784 | 7/1999 |
| JP | 2002-150822 | 5/2002 |
| JP | 2006-071000 | 6/2006 |
| JP | 2006/189609 | 7/2006 |
| JP | 2008-089709 | 4/2007 |
| JP | 2009-008928 | 1/2009 |
| TW | 2006/19758 | 6/2006 |

OTHER PUBLICATIONS

U.S. Appl. No. 12/330,155, filed Dec. 8, 2008 Titled Passive and Hybrid Daylight-Coupled Backlights for Sunlight Viewable Displays.

* cited by examiner

PASSIVE AND HYBRID DAYLIGHT-COUPLED N-STACK AND COLLAPSIBLE BACKLIGHTS FOR SUNLIGHT VIEWABLE DISPLAYS

BACKGROUND

Sunlight viewability of digital displays, such as a liquid crystal display (LCD), is increasing in business importance as such displays become more ubiquitous. Advertisers desire the ability to use digital media in outdoor environments, and consumers would like their electronics to be usable everywhere. Current solutions to the outdoor sunlight visibility problem fall short because of insufficient display brightness or excessive power consumption and its resultant heat load. For example, one solution achieves 2000 nits brightness by using 720 three watt LEDs in a 40 inch display, which requires a liquid cooling system to dissipate the 2.1 kW of heat. Also, the display with backlight weighs 110 lbs., a significant amount of weight for such a display.

SUMMARY

An N-stack daylight-coupled display, consistent with the present invention, includes a plurality of passive backlights cascaded for backlighting of LCD panels or static display panels. The display includes a diffuser to transmit light to multiple cascaded curved reflectors, each of which reflects light for backlighting of the display.

One N-stack display can include an active light source to provide light to the reflectors, and a secondary light source to provide light to at least one of the reflectors, to provide backlighting of the display in low lighting conditions.

A daylight-coupled static display, consistent with the present invention, includes a static display panel, a diffuser, and a curved reflector to reflect light transmitted by the diffuser for backlighting the static display panel.

A collapsible daylight-coupled display, consistent with the present invention, includes daylight-coupled backlight that is collapsible when not in use for hand-held or portable display devices.

BRIEF DESCRIPTION OF THE DRAWINGS

The accompanying drawings are incorporated in and constitute a part of this specification and, together with the description, explain the advantages and principles of the invention. In the drawings.

DETAILED DESCRIPTION

Using sunlight as a source of illumination for a display helps to save electrical power, enabling a more energy-efficient display. The daylight-coupled backlight provides a daylight-viewable solution that is potentially solar powered and also produces a high brightness display. At night-time or other low ambient light conditions, the backlight can be supplemented with an active light source. By using the sun to light the backlight, it saves a substantial power load and enables an energy efficient display, daylight viewable, that is potentially completely solar powered and also produces a high brightness display.

Daylight-coupled LCD devices can be used in a variety of outdoor settings for digital signage, traffic signage, or to display of other types of information. The devices can be housed in a kiosk or other types of enclosures depending upon, for example, a desired use of the devices. The devices can be used on bus shelters, sides of buildings, trucks, trailers, or other outdoor locations for advertisement or other information presentation. They can also be used in a variety of indoor settings to display information or advertisement in store-front windows, high-ambient mall courtyards, or other locations. They can also be used inside of a car to display information on the center stack, driver cluster or dashboard. They can be mounted on the backside of the headrests or from the ceiling to display entertainment within a vehicle. The devices can also be in a smaller form factor as well—display diagonals less than 7 inches. The display panels in the devices can be arranged in a portrait mode or a landscape mode for display of information. They may also be set side by side to simulate a larger display or make for a group of displays.

The term LCD is used here to represent the variety of liquid crystal panels currently available on the market and those that may become available in the future, including, but not limited to conventional TN panels; PVA, MVA or OCB mode panels; and transflective panels. Additionally, the LCD panels may be substituted with other backlit light-valve type displays, other backlit electronic displays, electronic signage, or static signage. Also, the LCD panels may be substituted with solar panels to enhance the amount of daylight upon the solar panels or allow the solar panels to be configured in varying orientations, or the LCD panels may be substituted with other devices requiring illumination. The backlight can be designed to be collapsible so that it functions as a more conventional backlight in its collapsed state, but by means of hinges, springs, or slides, rearranges to form the backlight described in the present specification. Additionally, it may be designed to be collapsible for purposes of transportation or storage.

Preferably, highly reflective specular films are used throughout the cavity. However, optionally, diffusers may be added at various locations, such as behind the LCD panel, for example, to hide seams or interfaces between components. All diffusers in the system, including the entrance aperture, may be passive such as bead coated films and bulk diffuser plates, or they may be actively controlled such as PDLC (Polymer Dispersed Liquid Crystal) films or plates, for example. The diffusers may be uniform in characteristics or non-uniform, such as printed dot extractors, variable density films or plates, or other patterned systems.

Examples of various passive and hybrid backlights are disclosed in U.S. patent application Ser. No. 12/330155, entitled "Passive and Hybrid Daylight-Coupled Backlights for Sunlight Viewable Displays, and filed Dec. 8, 2008, which is incorporated herein by reference as if fully set forth.

Passive Daylight-Coupled Display

Figure 1:
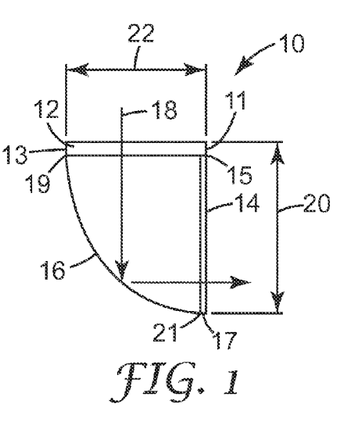
FIG. 1 is a side view of a first daylight-coupled LCD device.
Figure 2:
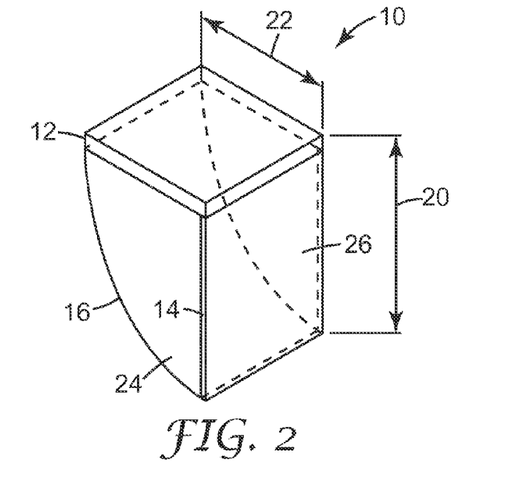
FIG. 2 is a perspective view of the daylight-coupled LCD device of FIG. 1.

FIG. 1 is a side view of a first daylight-coupled LCD device 10, and FIG. 2 is a perspective view of the daylight-coupled LCD device 10. Device 10 includes an LCD panel 14 having a top side 15 and a bottom side 17, a diffuser 12 having a front edge 11 and a back edge 13, a curved reflector 16 having a top side 19 and a bottom side 21, and side panels 24 and 26. Device 10 has a height 20 and depth 22.

As represented by arrow 18, diffuser 12 transmits at least some daylight to reflector 16 and possibly to other components. Reflector 16 then reflects the light upon LCD panel 14 in order to provide backlighting for the LCD panel. Device 10 is designed with a depth 22 and curvature of reflector 16 such that reflector 16 provides for substantially uniform distribution of the reflected daylight onto LCD panel 14. With a circular shape for reflector 16, meaning that it forms a portion of a circle, the ratio of the height 20 to depth 22 is approximately 1 to 1. In other embodiments, particular if a turning film is used behind the LCD panel, the ratio of the height of the LCD panel to the depth of the diffuser is approximately 1 to 0.5. A stacked reflector configuration can realize a preferred ratio of 1 to 0.375. In device 10, and in other daylight-coupled LCD devices, diffuser 12 is preferably positioned at an angle of approximately 90° with respect to LCD panel 14, although the angle can be greater than 120° and can also be less than 90°.

By using daylight for passive backlighting, the device can be used during the daytime in outdoor settings without the need for an active light source, thus saving power and reducing heat load on the device. To maintain brightness, an active light source can be used during cloudy conditions. If brightness under cloudy or dim ambient lighting is not a concern, then an active light source is not needed. In addition to using sunlight, the device 10 can use other external light sources for passive backlighting, such as streetlights, spotlights, projectors, or overhead fluorescent lights. All the external light sources can be combined and concentrated for the passive backlight using, for example, lenses, light pipes, mirrors, or ambient light concentrators.

Figure 3:
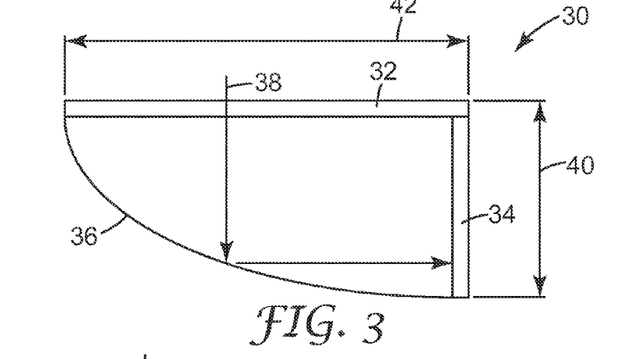
FIG. 3 is a side view of a second daylight-coupled LCD device.
Figure 4:
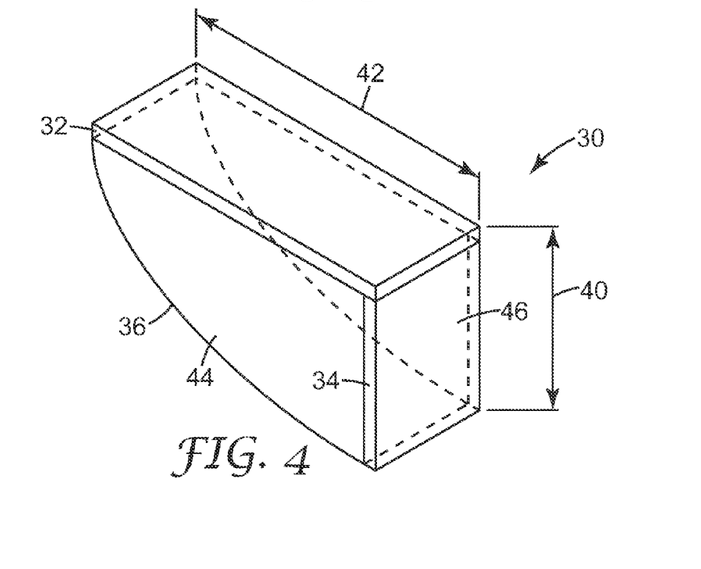
FIG. 4 is a perspective view of the daylight-coupled LCD device of FIG. 3.

FIG. 3 is a side view of a second daylight-coupled LCD device 30, and FIG. 4 is a perspective view of the daylight-coupled LCD device 30. Device 30 includes an LCD panel 34, a diffuser 32, a curved reflector 36, and side panels 44 and 46. Device 30 has a height 40 and depth 42.

As represented by arrow 38, diffuser 32 transmits at least some daylight to reflector 36 and possibly to other components. Reflector 36 then reflects the light upon LCD panel 34 in order to provide backlighting for the LCD panel. Device 30 is designed with a depth 42 and curvature of reflector 36 such that reflector 36 provides for substantially uniform distribution of the reflected daylight onto LCD panel 34. Having a deeper diffuser cavity, such as that shown in device 30 in comparison to device 10, can allow the diffuser to collect more light for the reflector and backlighting of the LCD panel, thereby enabling a wider viewing angle both horizontally and vertically. With a parabolic shape for reflector 36, meaning that it forms a portion of a parabola, the ratio of the height 40 to depth 42 can be approximately 1 to 3.

Although circular and parabolic shapes are shown for the reflectors, other shapes are possible, including a three-dimensional (3D) curvature or a straight reflector. Also, the shape of the reflector can be variable. For a shaped reflector, it is preferably shaped as a section of a parabola and is arranged with edges meeting the diffuser and LCD panel at an angle of approximately 20° to 40° to axes normal to the diffuser and LCD panel.

The diffusers in daylight-coupled LCD devices, such as diffusers 12 and 32, can be implemented with, for example, one or more of the following: beaded gain diffusers; microstructured gain diffusers; diffuser sheet materials such as bulk diffusers (particle filled, phase separated, or microcavitated); or diffuser plates. The diffuser can optionally be domed or faceted for concentrating the daylight or other light source. Diffusers 12 and 32 preferably block ultraviolet (UV) light, and reflectors 16 and 36 preferably transmit infrared (IR) light to avoid heat loading on the LCD device. The diffusers can provide sufficient diffusion of light to achieve uniform backlighting, and the diffusers typically transmit as least 50% and more preferably at least 70% of the visible light incident upon them, while exhibiting low clarity as measured by the Haze-Gard product available from BYK-Gardner USA.

The reflectors in daylight-coupled LCD devices, such as reflectors 16 and 36, can be implemented with, for example, one or more of the following: an Enhanced Specular Reflector (ESR) film available from 3M Company; a reflective polarizer; a reflective polarizing film; MIRO or MIRO Silver available from Anomet, Inc., Ontario, Canada; or the silvered or aluminized Mylar product available from E. I. DuPont DeNemours and Company.

Reflective polarizers are films that reflect one polarization preferentially over the other polarization. Reflective polarizer types include multilayer-based, blend or dispersed phase based, fiber-based, cholesteric liquid crystal-based, wire grid, or Brewster-angle effect polarizers. Specifically, multilayer reflective polarizers can be implemented with the following: DBEF (brightness enhancement film), such as DBEF-Q, D-400, and D2-400, all from 3M Company; Advanced Polarizing Film (APF), such as LEF-D, also from 3M Company; and other multilayer variants. These multilayer reflective polarizers can also provide for haze by having a low haze surface or matte finish. The DBEF-D400 film has 60% haze in both polycarbonate layers, and the stack as a whole demonstrates a haze of 72% +/−10%. The LEF-D film has 12% haze in one of the polycarbonate layers and 20% in the other, and the overall haze of stack is 41%+/−10%. A specific example of blend or dispersed phase reflective polarizers include DRPF, also from 3M Company. Brewster Angle reflective polarizers can be built using the "pile of plates" phenomenon. A preferred reflective polarizer is APF, which includes both the specular APF and LEF-D, which is APF sandwiched in-between two hazy polycarbonate films.

Use of the ESR film, or other reflective films that transmit IR light, leads to a decrease in the temperature of the LCD panel since the panel does not end up receiving and absorbing that IR light. Reflectors 16 and 36 preferably transmit infrared (IR) light to avoid heat loading on the LCD device. The reflector can optionally be faceted or coated to provide for particular visual effects and can also optionally include a bead coated or microstructured coated ESR film or a low haze coating. The reflector films can be supported by, for example, polymethyl methacrylate (PMMA) or other plastic plate, ESR film on stainless steel, or aluminum if additional mechanical support is desired. If a metal support or other material that reflects IR is used to support the ESR film, then it is preferable to reject IR before it enters the backlight cavity, for example using an IR mirror film, such as the Prestige or Crystalline film products available from 3M Company, on or under the diffuser plate, to reject the incident IR light. The reflectors preferably have a smooth curved shape when in use, although a curved shape having non-smooth portions can also be used. The reflectors are preferably specular and better than 80% reflective in the visible, and more preferably 90% or higher, and most preferably 98% or higher reflectivity. An example of such a film is the ESR film.

The side panels in daylight-coupled LCD devices, such as panels 24, 26, 44, and 46, can be implemented with, for example, the following: ESR film; a Lambertian reflector; a reflective fabric; or a diffuser plate. The panels can be implemented with separate components. Alternatively, the side panels and reflector can be formed together as a 3D cavity such as with a thermoformed reflector cavity.

The diffuser, reflector, and side panels in daylight-coupled LCD devices can be held together with a frame, for example. The components of the daylight-coupled LCD device can be adjacent one another by being in direct contact, by being connected through one or more other components such as a frame, or by being held next to one another or attached to one another. Adjacent components can optionally include an air gap between them.

Devices 10 and 30, and other daylight-coupled LCD devices, can include additional films on the front of the LCD panel. Examples of those additional films include the following: a shatter protection film such as the anti-splinter film product available from 3M Company; an anti-reflective coating or film; an anti-glare film; an IR filter film such as the Prestige or Crystalline film products available from 3M Company; and as a single film with multiple functionalities. Likewise, additional films may be used directly on or under the diffuser plate to provide UV protection, IR protection, shatter protection, and color correction. Additional films could also be included on the back of the LCD panel, either near, adjacent, or in contact with it. Examples of these films include the following: reflective polarizer film such as the DBEF product available from 3M Company; DBEF with a diffuse adhesive; and microreplicated films such as prismatic films or engineered diffusers, or combinations thereof.

N-Stack Backlights for Daylight-Coupled Displays

Figure 5:
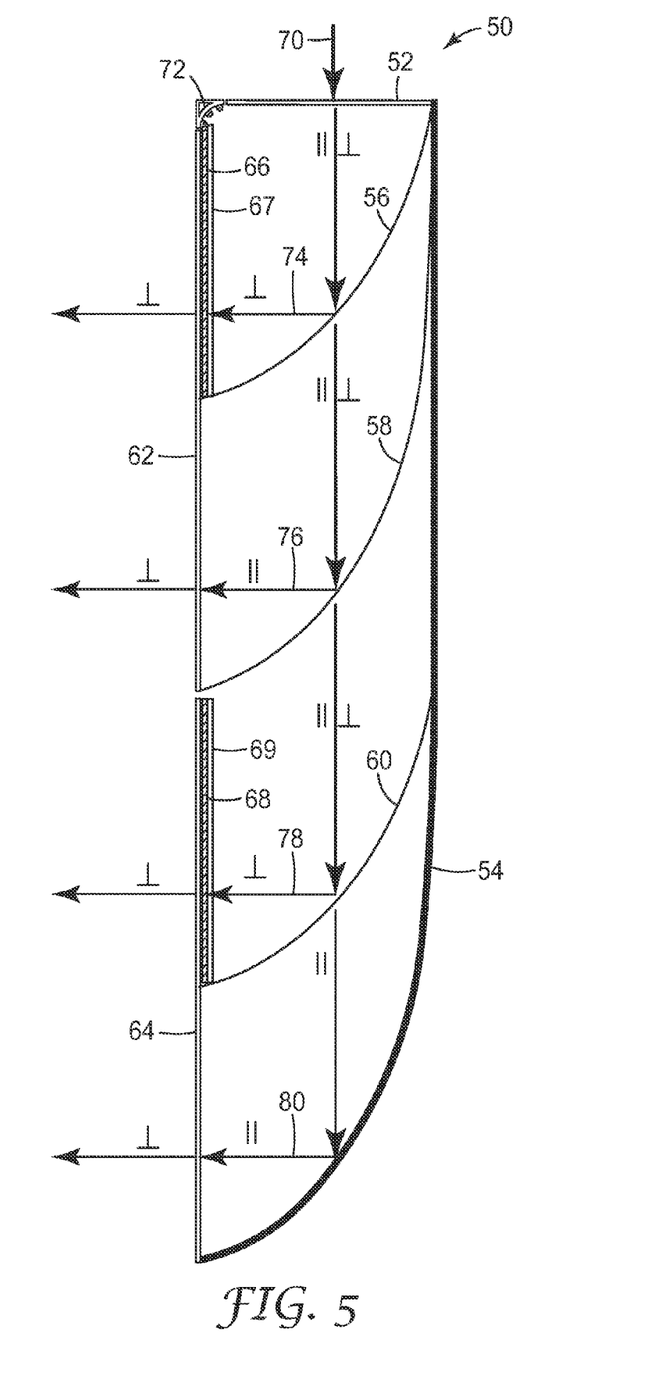
FIG. 5 is a side view of a first N-stack daylight-coupled LCD device.

FIG. 5 is a side view of a first N-stack daylight-coupled LCD device 50. Device 50 includes LCD panels 62 and 64, a diffuser 52, and curved reflectors 54, 56, 58, and 60. The curved reflector 54 is preferably implemented with a reflective polarizer, and the curved reflectors 56, 58, and 60 are each preferably implemented with partial reflective polarizers. As represented by arrow 70, diffuser 52 transmits daylight to reflectors 54, 56, 58, and 60. Reflector 56 reflects light of a first polarization 74 to LCD panel 62 to provide backlighting for an upper portion of LCD panel 62. Reflector 58 reflects light of a second polarization 76 to LCD panel 62 to provide backlighting for a lower portion of LCD panel 62. Reflector 60 reflects light of a first polarization 78 to LCD panel 64 to provide backlighting for an upper portion of LCD panel 64. Reflector 54 reflects light of a second polarization 80 to LCD panel 64 to provide backlighting for a lower portion of LCD panel 64. Reflectors 56 and 60 are preferably positioned such that one end of them is located adjacent approximately a mid-point of LCD panels 62 and 64, respectively. The reflectors collectively transmit light to provide for substantially uniform distribution of the reflected daylight onto the LCD panels 62 and 64. Device 50 also includes polarization rotators 66 and 68 with corresponding reflective polarizers 67 and 69 positioned adjacent and behind the upper portions of LCD panels 62 and 64, respectively, to provide the correct polarization of light for backlighting the upper portions. Alternatively, the positions of the polarization rotators 66 and 68 can be switched with the polarizers 67 and 69 such that the polarizers are positioned between the LCD panel and the polarization rotators. Device 50 can also optionally include an active light source 72, such as LEDs, for backlighting the LCD panels in low ambient conditions.

Figure 6:
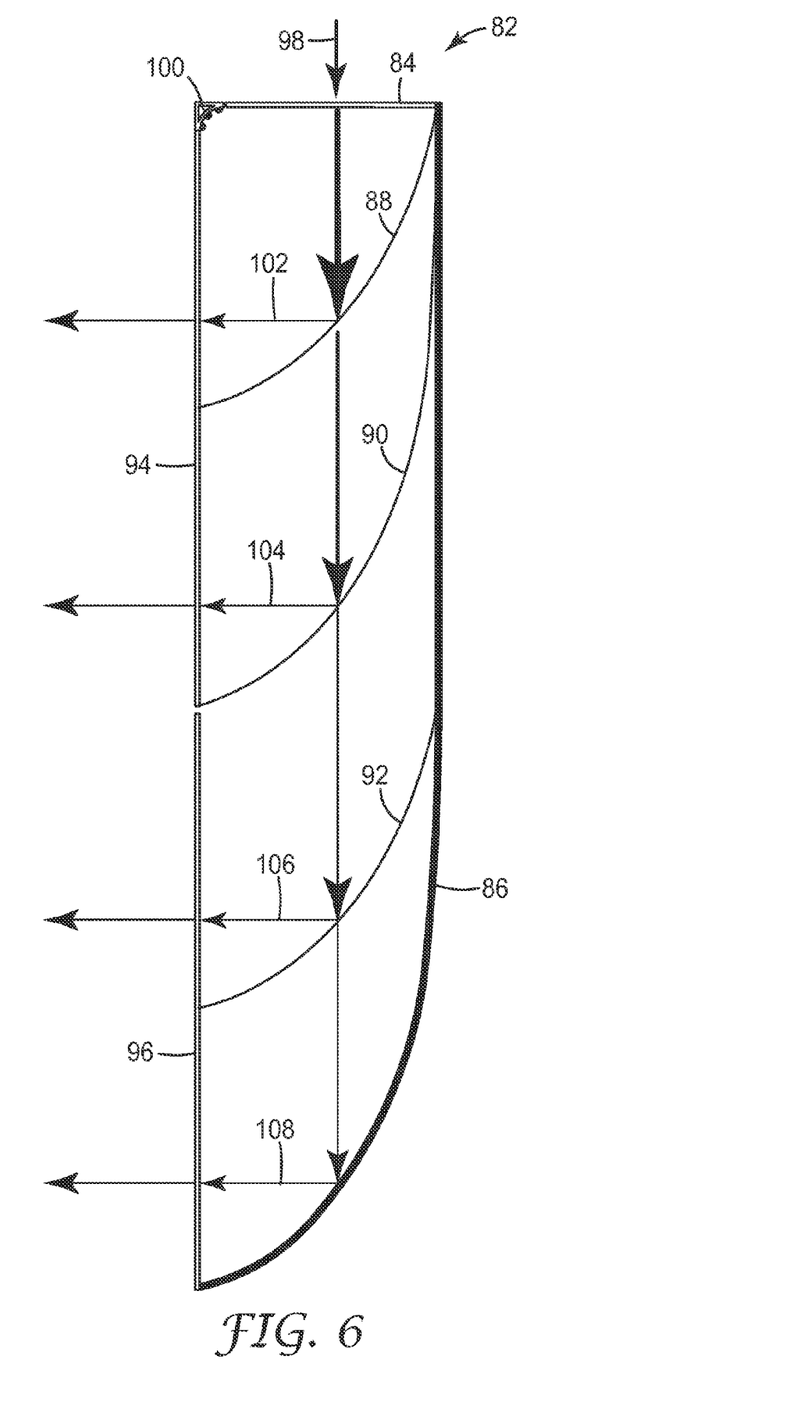
FIG. 6 is a side view of a second N-stack daylight-coupled LCD device.

FIG. 6 is a side view of a second N-stack daylight-coupled LCD device 82. Device 82 includes LCD panels 94 and 96, a diffuser 84, and curved reflectors 86, 88, 90, and 92. The curved reflector 86 is preferably implemented with a reflective polarizer, and the curved reflectors 88, 90, and 92 are each preferably implemented with partial mirrors. Examples of partial mirrors include perforated Lambertian reflectors and specular mirrors. As represented by arrow 98, diffuser 84 transmits daylight to reflectors 86, 88, 90, and 92. Reflector 88 reflects light 102 to LCD panel 94 to provide backlighting for an upper portion of LCD panel 94. Reflector 90 reflects light 104 to LCD panel 94 to provide backlighting for a lower portion of LCD panel 94. Reflector 92 reflects light 106 to LCD panel 96 to provide backlighting for an upper portion of LCD panel 96. Reflector 86 reflects light 108 to LCD panel 96 to provide backlighting for a lower portion of LCD panel 96. Reflectors 88 and 92 are preferably positioned such that one end of them is located adjacent approximately a mid-point of LCD panels 94 and 96, respectively. The reflectors collectively transmit light to provide for substantially uniform distribution of the reflected daylight onto the LCD panels 94 and 96. Device 82 can also optionally include an active light source 100, such as LEDs, for backlighting the LCD panels in low ambient conditions.

In the N-stack displays 50 and 82, the use of partial reflective polarizers or partial mirrors as the reflectors allows for a stack of arbitrary depth. Therefore, any number of reflectors and corresponding LCD panels can be cascaded in a stack in a similar manner as devices 50 and 82. Also, any of the LCD panels in an N-stack device can be replaced with a static display panel. In the N-stack displays, the display panels, whether LCD panels or static display panels, are preferably of substantially equal brightness when in operation, although they need not have the same brightness.

The term partial reflective polarizer refers to a film or layer that transmits most or all of one polarization and reflects a fraction of the orthogonal polarization and transmits the remainder of that orthogonal polarization. For example, this type of polarizer may be thought of as a "leaky" reflective polarizer, which can be realized by perforating APF or DBEF. The degree to which the APF or DBEF is perforated determines the degree to which it is a partial reflective polarizer film. Unperforated APF would be considered a "complete" reflective polarizer, whereas an APF that is 75% holes (perforations) by area could be described as a 25% partial reflective polarizer film. Other ways are possible to enable a reflective polarizer film to leak, which include selective spectral leakage by selecting layer thicknesses and controlling the degree of orientation of the film through draw ratio and processing conditions. Assuming the films exhibit no absorption, the polarization reflectance percentage is 100% minus the polarization transmissivity percentage.

To achieve a uniform distribution of light on a display panel, the first N-stack partial reflective polarizer layer may be selected to be 80% perforated, and thereby only 20% reflective to one polarization of light. The second partial reflective polarizer layer could be the orthogonal orientation, but also 20% reflective. The N-stack construction could then proceed in pairs, so that stack layers 3 and 4 would be selected to reflect approximately the same net amount of light as the correspondingly oriented layers 1 and 2. By means of example, when layer 3 is reached, only 80% of the original amount of light flux remains (assuming no light absorption or other losses). Assuming for the sake of example that 100 lumens make it through the entrance diffuser 52, in order to provide the same brightness as the first and second layers (20% of each respective polarization), the remaining light is 100 lumens originally minus 20 lumens extracted equals 80 lumens. To extract 20 lumens from the remaining 80 lumens requires a partial reflective polarizer with 25% reflectance (20 extracted lumens/80 remaining lumens). Layers 3 and 4 would each be 25% partial reflective polarizers, where preferably layer 3 orientation is the same as in layer 1, and layer 4 orientation is the same as layer 2. Layers 5 and 6 would likewise be 33.3% partial reflective polarizers (20 extracted lumens/60 remaining lumens). Further layer pairs would be calculated in an analogous manner, such that layers 7 and 8 are each 50% partial reflective polarizers (20 extracted lumens/40 remaining lumens), and finally, layers 9 and 10 would be 100% partial reflective polarizers (such as APF). The N-stack could also be built entirely out of perforated reflector films such as ESR or the silvered Mylar product for cases that do not require optimization of polarization, such as to illuminate static graphics.

In any of the N-stack embodiments, it may be desirable to reduce the visibility of the seams at the junction of two components. The visibility of the center seam where the reflector is located adjacent the mid-point of the LCD panel can be reduced or eliminated by tapering the edge of the reflector at the LCD panel. Furthermore, recessing the bottom of the top reflector into the backlight cavity can help to reduce the visibility of that line edge. The recessing includes providing a gap, such as an air gap, between the bottom edge of the top reflector and the LCD panel. Finally, the visibility of the edges of the curved reflectors can be reduced or eliminated by providing a groove in the side walls providing a close fit with the edges of the reflectors. Lastly, further seam or defect hiding can be accomplished by using a randomized printed diffusion pattern at the localized area where the defect is visible.

In the N-stack embodiments, they can optionally include the following features. They can have a domed enclosure on top of the stack, and the diffuser can be domed to provide the enclosure. The stack can include an overhang for shading the displays. Instead of having displays on only one side, they can include displays on both, opposite sides, and the stack can be mounted on a pivot so that it can rotate to allow viewing of the displays from one location or for other effects. Also, instead of being arranged vertically, the N-stack can be arranged horizontally with the multiple displays arranged side by side rather than on top of one another. Whether arranged vertically or horizontally, the N-stack can include connectors to join together the individual displays and passive backlights.

Daylight-Coupled Display with Secondary Light Source

Figure 7:
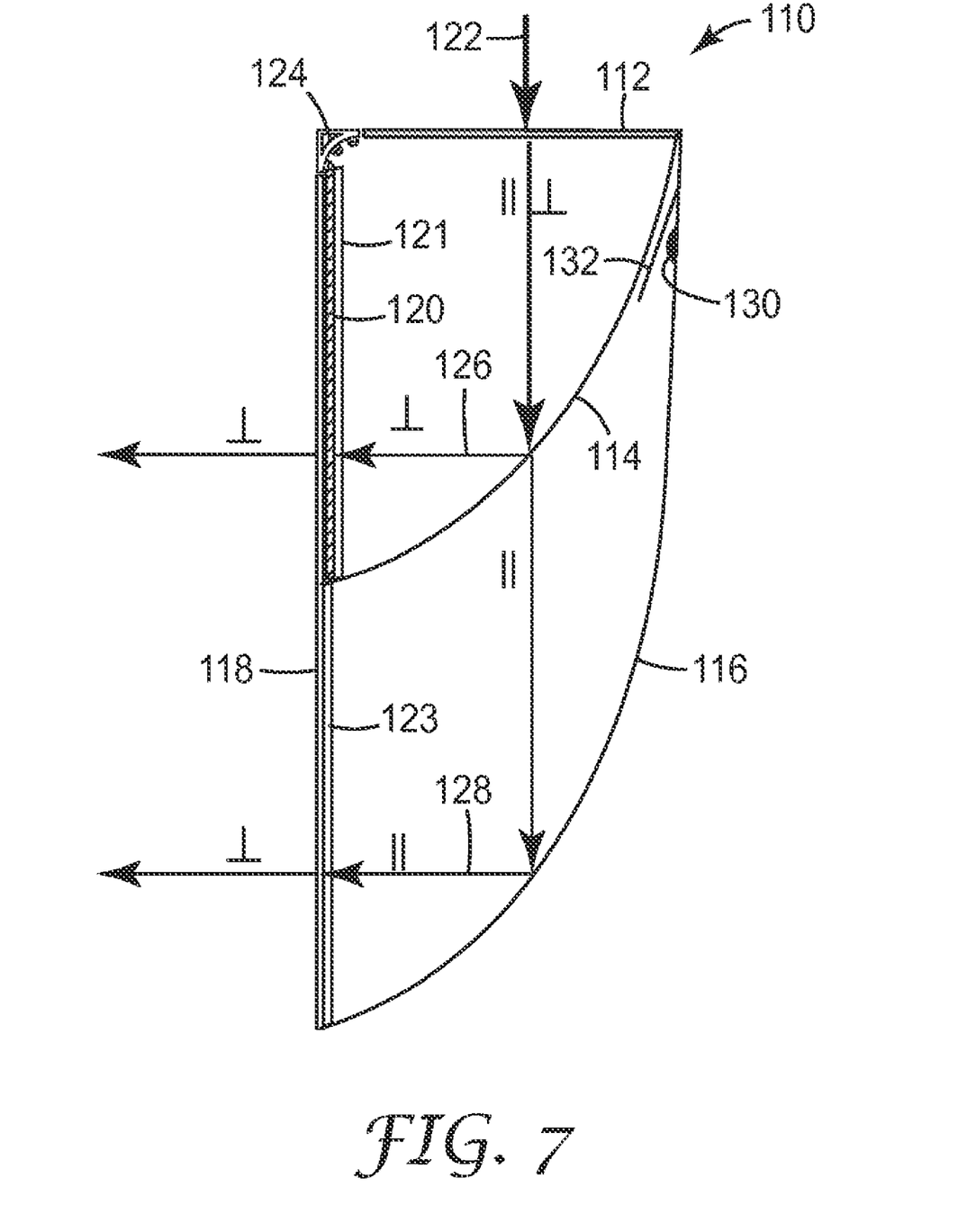
FIG. 7 is a side view of a stacked daylight-coupled LCD device with a secondary light source.

FIG. 7 is a side view of a N-stack daylight-coupled LCD device 110 with a secondary light source. Device 110 includes an LCD panel 118, a diffuser 112, and curved reflectors 114 and 116. The curved reflectors 114 and 116 are each preferably implemented with a reflective polarizer. As represented by arrow 122, diffuser 112 transmits daylight to reflectors 114 and 116. Reflector 114 reflects light of a first polarization 126 to LCD panel 118 to provide backlighting for an upper portion of LCD panel 118. Reflector 116 reflects light of a second polarization 128 to LCD panel 118 to provide backlighting for a lower portion of LCD panel 118. Reflector 114 is preferably positioned such that one end of it is located adjacent approximately a mid-point of LCD panel 118. The reflectors collectively transmit light to provide for substantially uniform distribution of the reflected daylight onto LCD panel 118. Device 110 also includes a polarization rotator 120 with corresponding reflective polarizer 121 positioned adjacent and behind the upper portion of LCD panel 118 to provide the correct polarization of light for backlighting the upper portion, and device 110 includes an optional reflective polarizer 123 positioned adjacent and behind the lower portion of LCD panel 118 and aligned with the pass axis of LCD panel 118. Device 110 also includes an active light source 124, such as LEDs, for backlighting the LCD panels in low ambient conditions. Furthermore, device 110 includes a secondary light source 130, such as LEDs, located on or adjacent reflector 116 and adjacent a reflector 132 for providing supplemental backlighting of LCD panel 118 in low ambient light conditions. Reflector 132 is preferably implemented with ESR film to reflect light from secondary source 130 to reflector 116.

Device 110 can alternatively be used as a daylighting device without the light source 124, secondary light source 130, and reflector 132. In that alternative use, reflectors 114 and 116 can each be implemented with a reflective polarizer, or optionally reflector 114 is implemented with a reflective polarizer and reflector 116 is implemented with ESR film.

Static Daylight-Coupled Display

Figure 8:
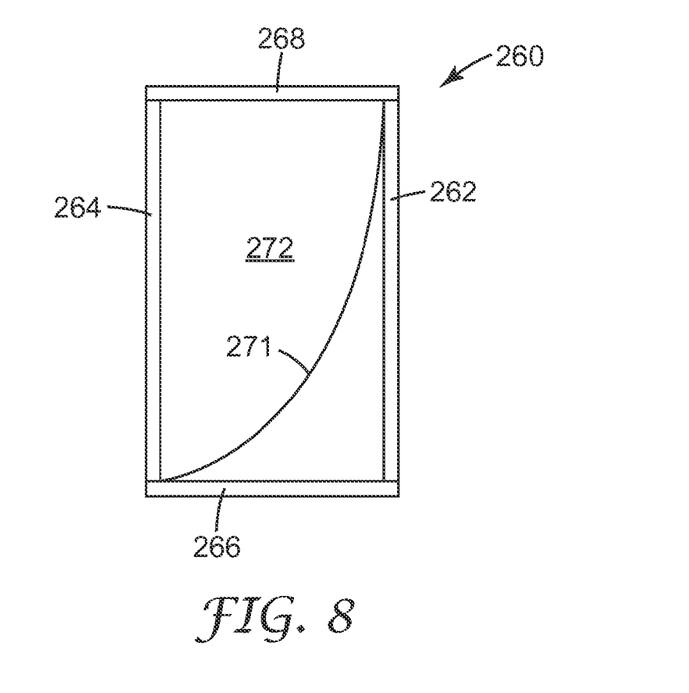
FIG. 8 is a side view of a daylight-coupled display with a static display panel and curved reflector.
Figure 9:
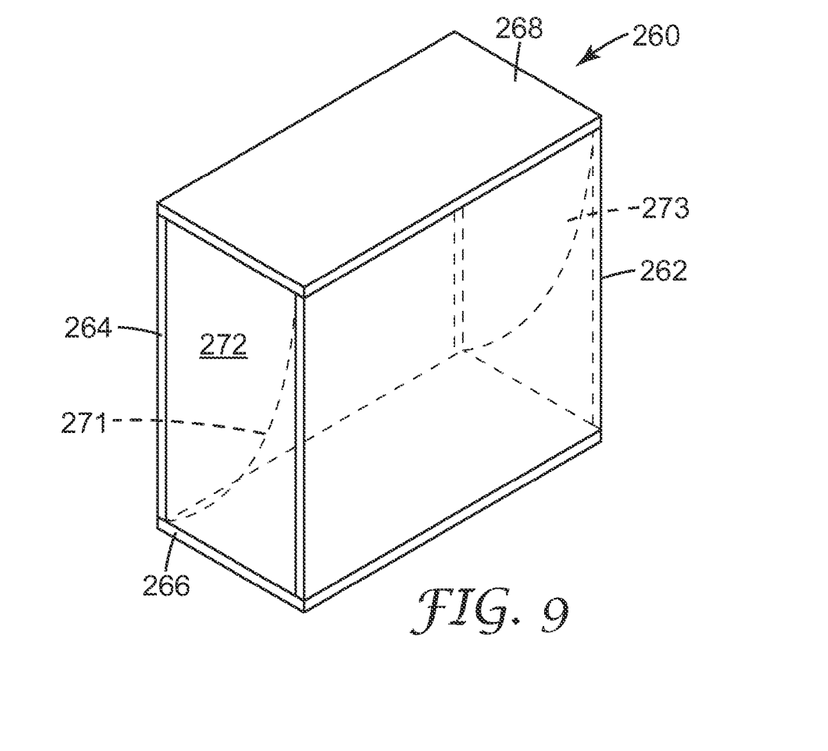
FIG. 9 is a perspective view of the daylight-coupled display with a static display panel of FIG. 8.

FIG. 8 is a side view of a daylight-coupled display 260 with a static display panel 264. FIG. 9 is a perspective view of display 260. Display 260 also includes a diffuser 268, a bottom panel 266, side panels 272 and 273, a back panel 262, and a curved reflector 271. Display 260 can include a frame to provide structural support for these components. Bottom panel 266, side panels 272 and 273, and back panel 262 provide for enclosing display 260 and can also optionally provide structural support for display 260. Diffuser 268 transmits daylight into display 260, and curved reflector 271 provides for backlighting and illumination of static display panel 264. The configuration of display 260 preferably provides for substantially uniform backlighting of static display panel 264, uniform enough for sign applications. Curved reflector 271 can be implemented with, for example, a reflective polarizer or ESR film. Side panels 272 and 273 are optionally lined with reflectors, such as ESR film, silvered or aluminized plastics, or other reflector materials, and they are situated such that these reflective sides are facing inside display 260 in order to further backlight static display panel 264.

Display 260 can also be implemented without curved reflector 271, in which case bottom panel 266, side panels 272 and 273, and back panel 262 are all lined with a reflective material such as a reflective polarizer or ESR film on the inside of display 260 to provide for backlighting of static display panel 264.

Collapsible When Not in Use Passive Backlight

Figure 10:
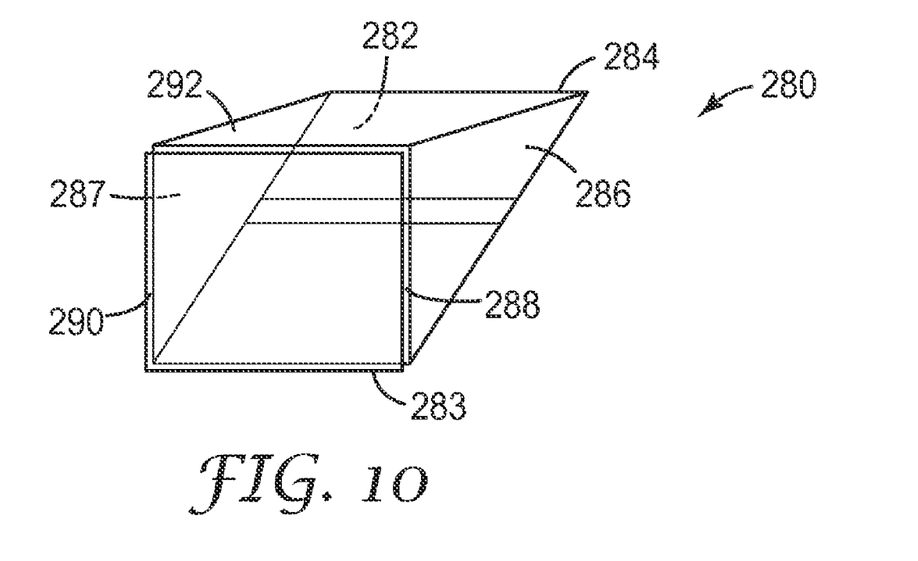
FIGS. 10-13 are perspective views of a passive backlight, collapsible when not in use, for a daylight-coupled display.
Figure 11:
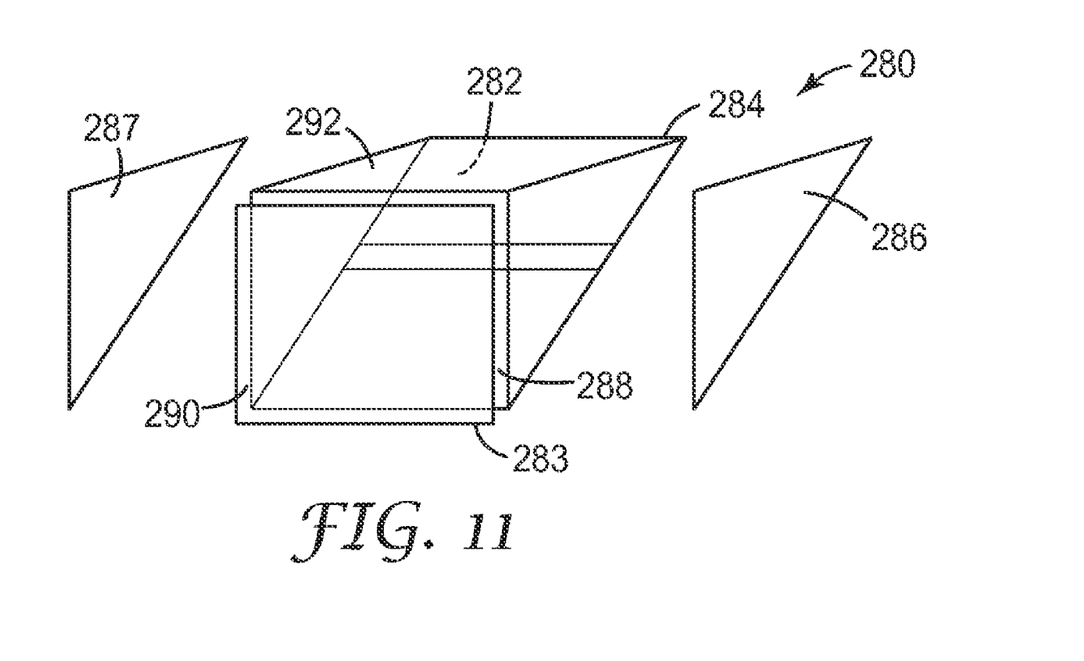

FIGS. 10-13 are perspective views of a passive backlight 280, collapsible when not in use, for a daylight-coupled display, preferably a hand-held or portable display. Collapsible backlight 280 includes a diffuser 292, side panels (reflector bellows) 286 and 287, a back reflector 282, and a slab backlight 288. FIG. 11 shows side panels 286 and 287 removed for illustrative purposes. Side panels 286 and 287 are also preferably implemented with reflectors to further reflect light for backlighting of LCD panel 290. Side panels 286 and 287, and back reflector 282, can be implemented with a reflective polarizer, ESR film, or other reflective material such as rip stop fabric coated with the aluminized Mylar product. Although shown substantially planar, back reflector 282 can be optionally curved, in which case the bottom edges of side panels 286 and 287 are also curved according to the curvature of back reflector 282.

Figure 12:
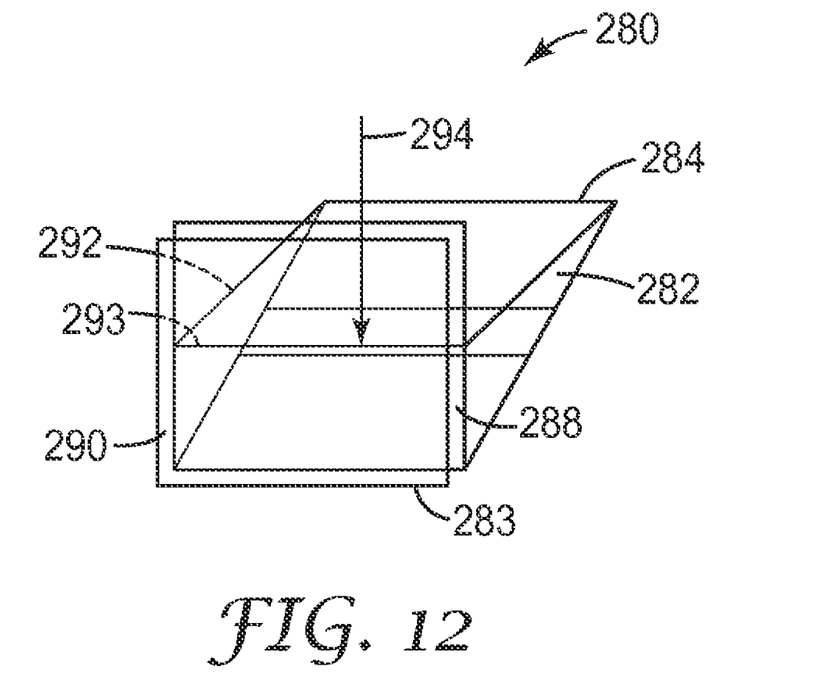
Figure 13:
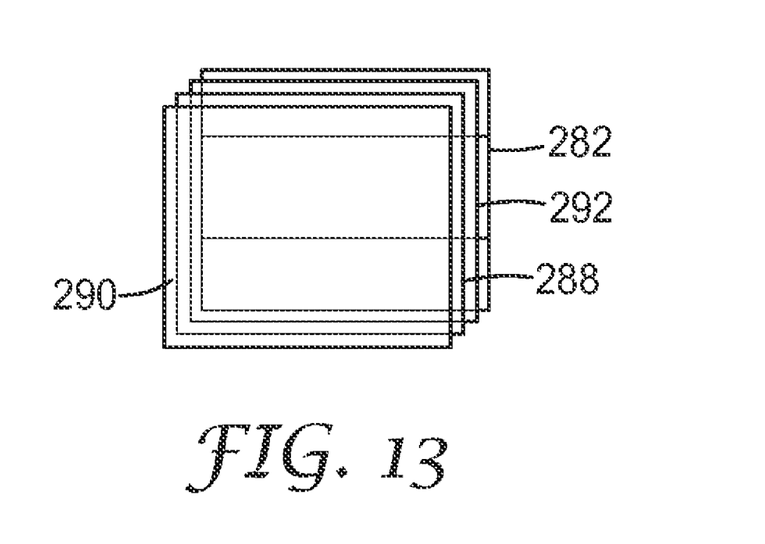

When in use, as shown in FIG. 10, diffuser 292 transmits daylight or ambient light to back reflector 282, which provides for backlighting of an LCD panel 290. When backlight 280 is not in use, it is a least partially collapsible against the back of slab backlight 288 to be more compact for portability, for example. As illustrated in FIGS. 11-13, side panels 286 and 287 can fold inward against or proximate back reflector 282, and a hinge 284 allows diffuser 292 to be pushed down, as illustrated by arrow 294 in FIG. 12, along a diffuser guide 293. A hinge 283 allows back reflector 282 to fold up against or proximate backlight 288 and LCD panel 290. Therefore, to effectively close the backlight, a user can fold side panels 286 and 287 inward and then push down on diffuser 292, as shown by arrow 294, to at least partially collapse backlight 280. FIG. 13 illustrates backlight 280 in a collapsed state when not in use. Slab backlight 288 includes an active light source and provides for backlighting LCD panel 290 when the passive backlight is not in use and for optionally supplementing the backlighting when the passive backlight is in use.

Examples of hand-held or portable devices that can use this collapsible passive backlight include the following: DVD players; digital music players; depth finders; global positioning satellite (GPS) devices; mobile phones; digital cameras or video cameras, and any portable devices used in an outdoor environment.

Example for Brightness Uniformity

The following illustrates the meaning of substantially uniform distribution of daylight with passive backlights to provide for useable daylight-coupled displays.

A stacked daylight-coupled LCD display was constructed similar to FIG. 7. DBEF D-400 was used as the curved back reflector. An experimental silvered acrylic film (3M Company) was used for the sidewall reflectors. APF was used as reflective polarizer 121. A conventional polycarbonate retarder film with nominal retardance of 280 nanometers was used as polarization rotator 120. A 75% transmissive diffuser plate (CLAREX DR-III C LIGHT DIFFUSION FILTER, grade DR-75C, Astra Products, Baldwin, N.Y.) was used as the entrance diffuser 112. Uniformity was measured according to the VESA 2.0 Nine-point test method using a custom-built sunlight simulator. Uniformity was measured as (minimum brightness)/(maximum brightness) and is expressed as a percentage. Uniformity of the top half (zone) of the display was 47%, uniformity of the bottom half (zone) of the display was 75%, and nine-point uniformity of the full portrait-mode display was 69%, all of which appeared to be of sufficient uniformity for use outdoors, for example in outdoor quick service restaurant applications, according to a number of observers. The ratio of the top half brightness to the bottom half brightness was 1.03, which was also considered good.

Zonal uniformities of 30% or better are preferable, 50% or better is more preferred, and 75% or better is most preferred. Ratios of top brightness to bottom brightness in the range of 0.6 to 1.5 are preferable, 0.8 to 1.3 are more preferred, and 0.9 to 1.1 are most preferred.

The invention claimed is:

1. An N-stack passive daylight-coupled display, comprising:
   one or more LCD panels collectively having a top side and a bottom side and one or more display surfaces between the top and bottom sides;
   a plurality of curved reflectors cascaded in a stack for providing backlighting to the LCD panels, wherein the stack includes a top reflector positioned opposite the top side of the one or more LCD panels; and
   a diffuser for transmitting daylight to the plurality of curved reflectors, the diffuser having a front edge and a back edge with a major surface of the diffuser extending between the front and back edges,
   wherein the front edge of the diffuser is positioned adjacent the top side of the one or more LCD panels and the back edge of the diffuser is positioned adjacent the top reflector,
   wherein the plurality of curved reflectors provide for substantially uniform distribution of the daylight on the one or more LCD panels,
   and wherein one or more of the plurality of curved reflectors comprise a reflective polarizer.

2. The display of claim 1, wherein the reflective polarizer comprises a partial reflective polarizer.

3. The display of claim 1, further comprising polarization rotators positioned behind portions of each of the one or more LCD panels.

4. The display of claim 3, further comprising reflective polarizers positioned behind the polarization rotators.

5. The display of claim 1, further comprising an active light source for providing active backlighting of the one or more LCD panels.

6. The display of claim 1, wherein a ratio of a height of the LCD panel to a depth of an active portion of the diffuser is approximatelyb 1 to 0.5.

7. An N-stack passive daylight-coupled display, comprising:
   one or more LCD panels collectively having a top side and a bottom side and one or more display surfaces between the top and bottom sides;
   a plurality of curved reflectors cascaded in a stack for providing backlighting to the LCD panels, wherein the stack includes a top reflector positioned opposite the top side of the one or more LCD panels; and
   a diffuser for transmitting daylight to the plurality of curved reflectors, the diffuser having a front edge and a back edge with a major surface of the diffuser extending between the front and back edges,
   wherein the front edge of the diffuser is positioned adjacent the top side of the one or more LCD panels and the back edge of the diffuser is positioned adjacent the top reflector,
   wherein the plurality of curved reflectors provide for substantially uniform distribution of the daylight on the one or more LCD panels,
   and wherein one or more of the plurality of curved reflectors comprise a partial mirror.

8. The display of claim 7, wherein the partial mirror comprises a perforated Lambertian reflector or a specular mirror.

9. The display of claim 7, further comprising polarization rotators positioned behind portions of each of the one or more LCD panels.

10. The display of claim 9, further comprising reflective polarizers positioned behind the polarization rotators.

11. The display of claim 9, further comprising a reflective polarizer positioned behind the one or more LCD panels on a portion not including the polarization rotators.

12. The display of claim 7, further comprising an active light source for providing active backlighting of the one or more LCD panels.

13. The display of claim 7, wherein a ratio of a height of the LCD panel to a depth of an active portion of the diffuser is approximately 1 to 0.5.

14. A passive daylight-coupled display, comprising:
   an LCD panel having a top side and a bottom side;
   a diffuser having a front edge adjacent the top side of the LCD panel and having a back edge;
   a first reflector having a top side adjacent the back edge of the diffuser and having a bottom side adjacent approximately a mid-point of the LCD panel;

a second reflector having a top side adjacent the back edge of the diffuser and having a bottom side adjacent the bottom side of the LCD panel;

a polarization rotator located behind the LCD panel from either approximately the mid-point of the LCD panel to the bottom side of the LCD panel or approximately the mid-point of the LCD panel to the top side of the LCD panel; and a reflective polarizer located behind the polarization rotator, wherein the diffuser transmits daylight to the first and second reflectors, the first reflector reflects the daylight to a top portion of the LCD panel and provides for substantially uniform distribution of the daylight on the top portion of the LCD panel, and the second reflector reflects the daylight to a bottom portion of the LCD panel and provides for substantially uniform distribution of the daylight on the bottom portion of the LCD panel.

15. The display of claim 14, further comprising an active light source positioned adjacent the front end of the diffuser, wherein the active light source provides for active backlighting of the LCD panel.

16. The display of claim 14, wherein at least one of the first and second reflectors comprises a reflective polarizing film.

17. The display of claim 14, wherein a ratio of a height of the LCD panel to a depth of an active portion of the diffuser is approximately 1 to 0.5.

18. The display of claim 14, wherein the bottom edge of the first reflector is tapered.

19. The display of claim 14, wherein the bottom edge of the first reflector is recessed into a backlight cavity behind the LCD panel.

20. The display of claim 14, further comprising side walls having grooves for containing side edges of the first and second reflectors.

21. The display of claim 14, wherein at least one of the first and second reflectors include a low haze surface.

22. A passive daylight-coupled display with a secondary light source, comprising:

an LCD panel having a top side and a bottom side;

a diffuser having a front edge adjacent the top side of the LCD panel and having a back edge;

a first reflector having a top side adjacent the back edge of the diffuser and having a bottom side adjacent approximately a mid-point of the LCD panel;

a second reflector having a top side adjacent the back edge of the diffuser and having a bottom side adjacent the bottom side of the LCD panel;

an active light source positioned adjacent the front end of the diffuser; and a secondary light source positioned adjacent the second reflector and behind the first reflector, wherein the diffuser transmits daylight to the first and second reflectors, the first reflector reflects the daylight to a top portion of the LCD panel and provides for substantially uniform distribution of the daylight on the top portion of the LCD panel, and the second reflector reflects the daylight to a bottom portion of the LCD panel and provides for substantially uniform distribution of the daylight on the bottom portion of the LCD panel, and wherein the active light source and the secondary light source provide for active backlighting of the LCD panel.

23. The display of claim 22, wherein the active light source and the secondary light source each comprise LEDs.

24. The display of claim 22, further comprising a reflective film located between the first reflector and the secondary light source.

* * * * *

UNITED STATES PATENT AND TRADEMARK OFFICE
CERTIFICATE OF CORRECTION

PATENT NO. : 8,339,542 B2
APPLICATION NO. : 12/492166
DATED : December 25, 2012
INVENTOR(S) : Rolf W Biernath Page 1 of 1

It is certified that error appears in the above-identified patent and that said Letters Patent is hereby corrected as shown below:

Title Page 2, Column 2
Line 11, Delete "JP  2006-071000" and insert -- KR  2006-071000 --, therefor.
Line 13, Delete "JP  2008-089709" and insert -- KR  2008-089709 --, therefor.
Line 14, Delete "JP  2009-008928" and insert -- KR  2009-008928 --, therefor.

In the Claims
Column 10
Line 22, In Claim 6, delete "approximatelyb" and insert -- approximately --, therefor.

Signed and Sealed this
Eighteenth Day of June, 2013

Teresa Stanek Rea
*Acting Director of the United States Patent and Trademark Office*